40-502 SR
2/24/87 DR RE 32,359

United States Patent [19]

Seely

[11] E Patent Number: Re. 32,359

[45] Reissued Date of Patent: Feb. 24, 1987

[54] PORTABLE WIND-RESISTANT SIGN STAND WITH FLEXIBLE SIGN

[75] Inventor: James R. Seely, Rochester, Mich.

[73] Assignee: Marketing Displays, Inc., Farmington Hills, Mich.

[21] Appl. No.: 797,978

[22] Filed: Nov. 14, 1985

Related U.S. Patent Documents

Reissue of:

[64] Patent No.: 4,516,344
Issued: May 14, 1985
Appl. No.: 567,379
Filed: Dec. 30, 1983

[51] Int. Cl.[4] ..... G09F 7/00

[52] U.S. Cl. ..... 40/602; 40/606

[58] Field of Search ..... 40/602, 608, 606, 607, 40/613

[56] References Cited

U.S. PATENT DOCUMENTS

| | | | |
|---|---|---|---|
| 1,532,536 | 4/1925 | Kress | 40/606 |
| 2,467,187 | 4/1949 | Capper | 40/613 |
| 3,287,840 | 11/1966 | Keats | 40/602 |
| 3,422,556 | 1/1969 | Lyons et al. | 40/16.4 |
| 3,646,696 | 3/1972 | Sarkisian | 40/606 |
| 3,662,482 | 5/1972 | Sarkisian | 40/602 |
| 3,828,455 | 8/1974 | Bentley | 40/602 |
| 4,033,536 | 7/1977 | Hillstrom | 40/608 |
| 4,265,040 | 5/1981 | Sarkisian | 40/606 |
| 4,288,053 | 9/1981 | Sarkisian | 40/607 |

*Primary Examiner*—Robert P. Swiatek
*Assistant Examiner*—Cary E. Stone
*Attorney, Agent, or Firm*—Harness, Dickey & Pierce

[57] ABSTRACT

A preferred lightweight, portable sign and stand apparatus generally includes a plurality of ground-engaging legs secured to a longitudinally-extending elongated base assembly. The base assembly of the preferred apparatus includes clamping members for clampingly anchoring a thin, flat sign panel protruding generally upwardly therefrom. The sheet material of which the sign panel is composed is sufficiently rigid that the sign panel is self-supporting in its protruding relationship with the base assembly. The sign panel is sufficiently flexible and resilient, however, to bendably deflect in a generally lateral direction, without yielding, in response to transverse loads exerted thereon, thereby substantially preventing the sign and stand apparatus from tipping over. The sign and stand apparatus also preferably has a resultant or combined center of gravity that remains inboard of the engagement of the legs with the ground in order to further resist any tendency to tip over in high winds.

27 Claims, 11 Drawing Figures

FIG. 3.
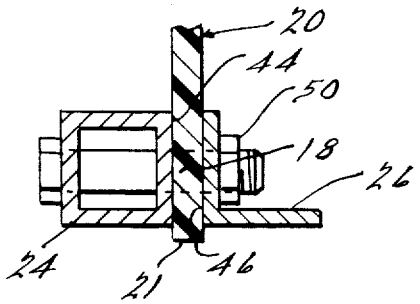
FIG. 4.
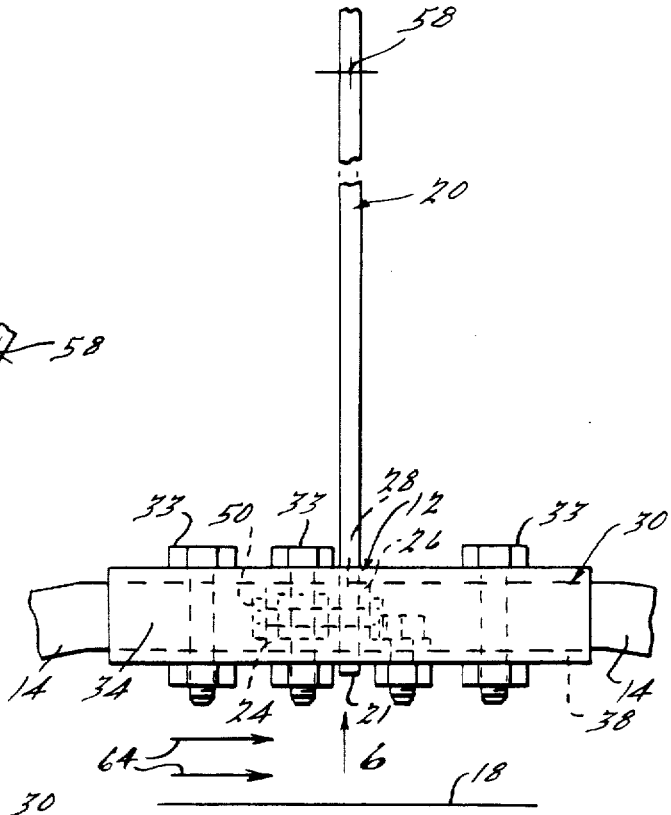
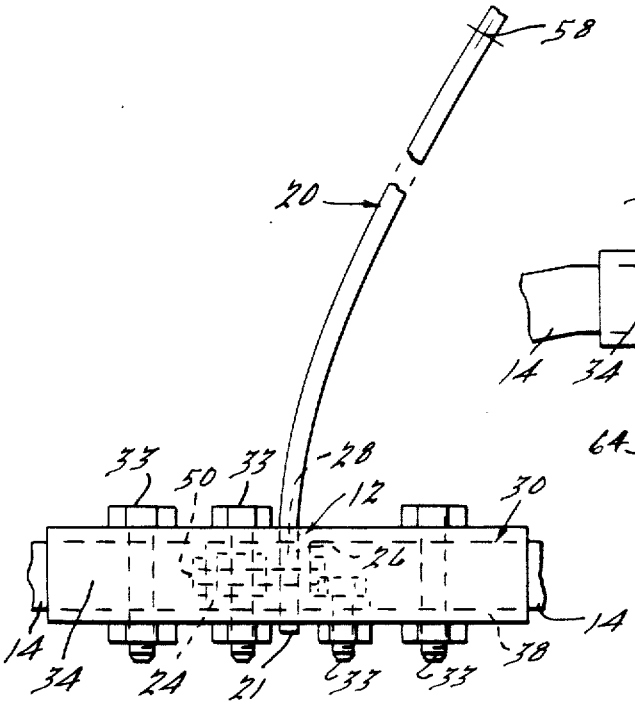
FIG. 5.
FIG. 6.
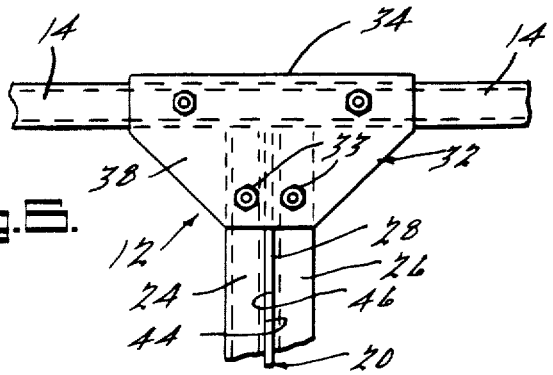

PORTABLE WIND-RESISTANT SIGN STAND WITH FLEXIBLE SIGN

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to sign and poster display devices of all kinds. The invention more particularly relates to portable sign and stand apparatus having a wind-resistant, flexible sign panel.

Numerous sign stands and poster display devices known today are used for displaying various signs and messages for conveying advertisements and information to the public. In many of such sign and stand apparatuses, the signs are typically positioned on sign standards or posts that are anchored in the ground, held in place by sandbags or other heavy objects, or spring-mounted on bases which allow them bend or deflect without tipping over under high wind forces. Spring-mounted sign stands which can be used for this purpose are shown in U.S. Pat. Nos. 3,646,696; 3,662,482; 4,033,536; 4,265,040; and 4,288,053; as well as in copending patent applications, Ser. Nos. 274,400, filed June 17, 1981; 442,378, filed Nov. 17, 1982; 442,418, filed Nov. 17, 1982; and 442,419, filed Nov. 17, 1982. All of said copending applications are assigned to the same assignee as the invention herein, and their disclosures are hereby incorporated by reference herein. Such deflectable sign stands, although unanchored and lightweight, prevent tipping over or sliding of the sign and stand units in virtually all weather and wind conditions.

Although the above-described sign and sign stand units are well-adapted for a variety of sign or display applications, it is an object of the present invention to provide a portable and wind-resistant sign and stand apparatus that is even lighter in weight than the previous sign and stand units and which employs a minimum number of parts or components. A further object is to provide a sign and stand apparatus that has a unique and attractive appearance, is inexpensive to manufacture, and which may be used in many different applications, including point-of-purchase displays, pedestrian or vehicular traffic messages or barriers, commercial advertisements, etc.

In accordance with the present invention, an improved wind-resistant sign and stand apparatus generally includes an elongated base assembly, a plurality of ground-engaging legs extending transversely from and secured to, the elongated base assembly, and a one-piece monolithic sign panel protruding in a generally vertical direction from the base assembly. The sign panel, which is preferably composed of a thin, flexible sheet-like material, has a lower peripheral portion clamped to the base assembly and is sufficiently rigid that the remainder of the sign panel is self-supporting in its vertically protruding relationship with the base assembly. The sign panel is sufficiently flexible and resilient, however, to deflect without yielding in response to loads exerted thereon, such as high wind forces, for example. In a preferred embodiment of the invention, the sign panel is clamped to the base assembly and maintained in an elevated position such that its lower end is generally adjacent to the ground, but slightly spaced therefrom in order to minimize the amount of air that can pass under the sign panel in high winds, thereby substantially avoiding or minimizing the creation of [a] *aerodynamic forces* low pressure region on the downwind side of the side panel. The sign and stand apparatus also preferably has a resultant or combined center of gravity that remains between the ground-engaging ends of the legs regardless of whether the sign panel is deflected or vertically disposed, thereby substantially preventing the sign and stand apparatus from tipping over in high winds.

Additional objects, advantages and features of the present invention will become apparent from the following description and appended claims, taken in conjunction with the accompanying drawings.

BRIEF DESCRIPTION OF THE DRAWINGS

FIG. 3 is a cross-sectional view, taken along 3—3 of FIG. 2.

FIG. 4 is a partial side elevational view of the sign panel and base assembly of the sign and stand apparatus of FIG. 1, with the sign panel illustrated in a vertical, undeflected position.

FIG. 5 is a view similar to that of FIG. 4, but with the sign panel illustrated in a deflected position.

FIG. 6 is a partial bottom view of the sign and stand apparatus, looking in the direction of the arrow 6 of FIG. 4.

DETAILED DESCRIPTION OF THE PREFERRED EMBODIMENTS

Figure 1:
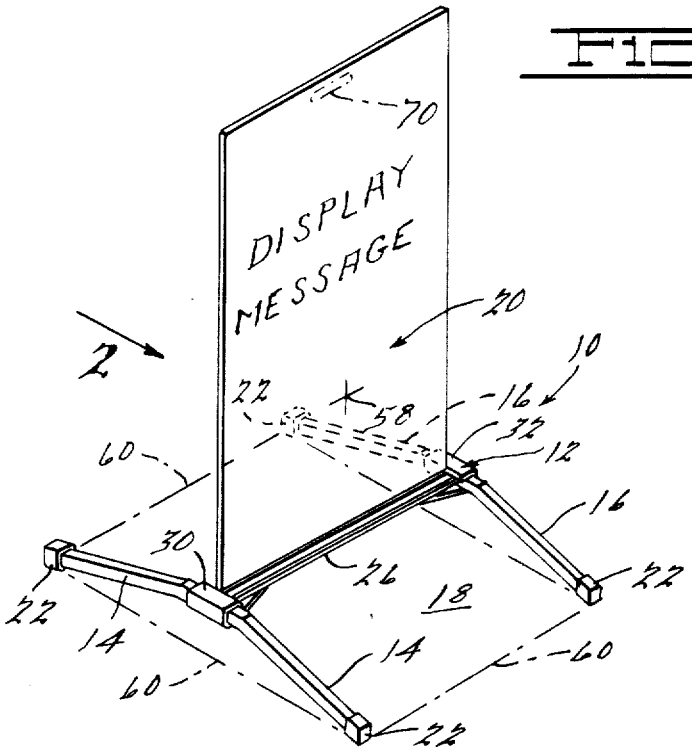
FIG. 1 is a perspective view of a sign and stand apparatus in accordance with one embodiment of the present invention.
Figure 2:
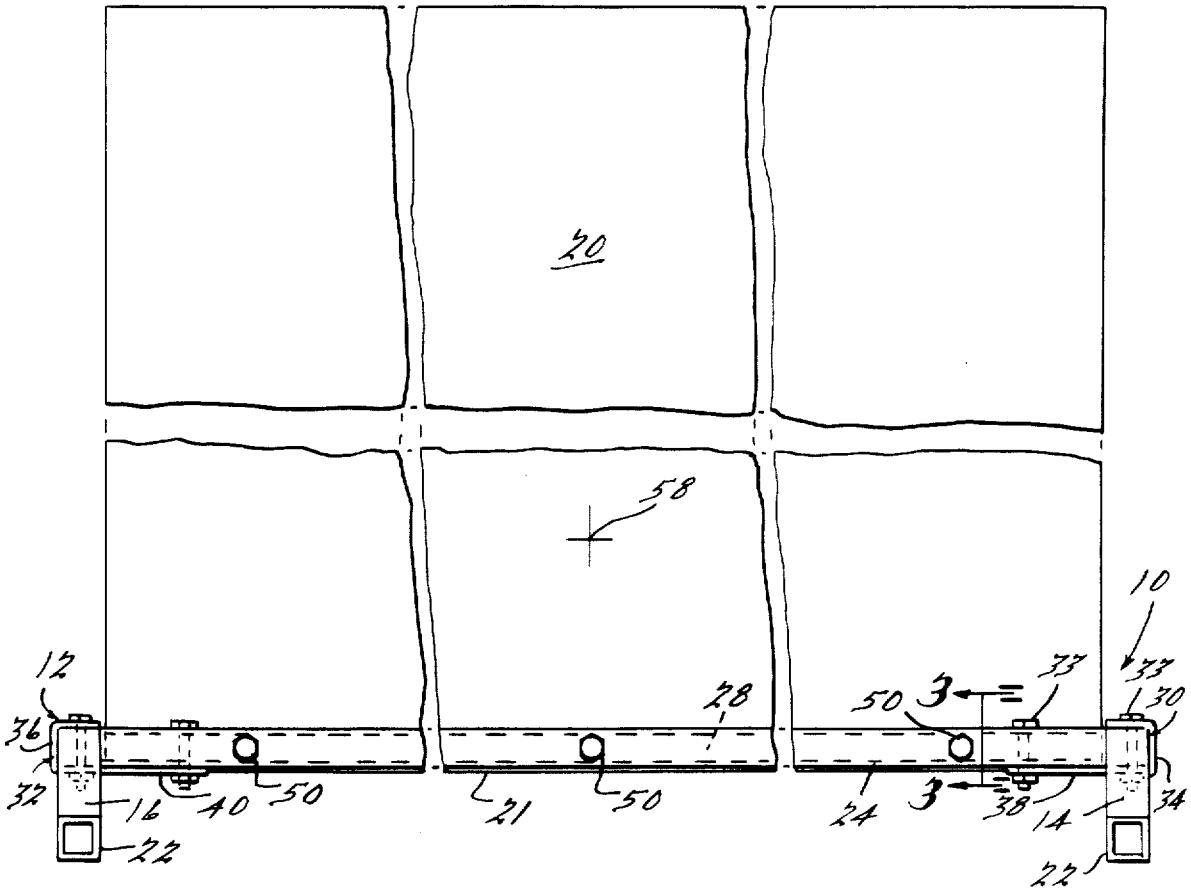
FIG. 2 is an elevational view, looking in the direction of the arrow 2 of FIG. 1.

FIGS. 1 through 7 illustrate an exemplary embodiment of a wind-resistant sign and stand apparatus in accordance with the present invention. One skilled in the art will readily recognize from the following discussion that the principles of the present invention are equally applicable to sign and stand units other than that shown for purposes of illustration in the drawings.

As shown in FIG. 1, an exemplary sign and stand apparatus 10 generally includes an elongated base assembly 12, a plurality of ground-engaging legs 14 and 16 extending transversely therefrom, and a relatively thin and generally flat sign panel 20 with a preselected display message on one or both sides thereof. The ground-engaging legs 14 and 16 preferably extend in a generally horizontal lateral direction relative to the longitudinally-extending base assembly 12, and are preferably adapted to maintain the base assembly 12 and the lower edge 21 of the sign panel 20 in a slightly elevated position, generally adjacent to, but spaced from, the ground or other supporting surface 18. Such slightly elevated positioning of the base assembly and sign panel serves to keep the free outer ends of the legs 14 and 16 in contact with the ground on uneven surfaces in order to maintain a wide base of support for the sign and stand assembly and thereby minimize its tendency to tip over. As is discussed in more detail below, however, the base assembly and the sign panel should be positioned as close to the ground as practicable in order to minimize the amount of wind that can pass below the sign panel. Optionally, the legs 14 and 16 may be equipped with caps or pods 22, which if used are preferably composed of rubber or other non-skid material to help prevent the sign and stand apparatus from sliding on smooth or hard supporting surfaces.

It is understood that the base assembly and legs can have any shape and cross-sectional configuration, so long as the points of contact of the base on the ground 18 generally form a perimeter shape and the center of gravity of the sign stand stays within it (as explained infra). The legs and base can also be foldable for ease of transportation and storage of the sign stand.

As is further illustrated in FIGS. 2 through 7, the base assembly 12 preferably includes a pair of elongated, generally longitudinally-extending clamping members 24 and 26, which clampingly secure and anchor a lower peripheral end portion 28 of the sign panel 20 therebetween. At least the clamping member 24 is preferably a hollow elongated member having a generally rectangular lateral cross-section, and is secured at opposite longitudinal ends to a pair of bracket members 30 and 32. In the preferred embodiment, the clamping member 26 is also secured at opposite longitudinal ends to the bracket members 30 and 32, but the clamping member 26 is preferably an elongated angle member having a generally L-shaped lateral cross-section. The preferred bracket members 30 and 32 generally include respective channel-shaped portion 34 and 36 adapted to receive the respective ground-engaging legs 14 and 16 therein, and respective horizontal plate portions 38 and 40, to which the preferred clamping members 24 and 26 are secured. As shown in the drawings, the members are secured together by a plurality of bolts 33, although it is understood that any other types of fasteners or securing means known to those skilled in the art can also be used. When secured to the bracket members 30 and 32, either or both of the clamping members 24 and 26 function to resist torsional loads exerted thereon as the sign panel 20 deflects under high wind loads as is described below.

The clamping members 24 and 26 include respective clamping faces 44 and 46 which clampingly engage the generally vertical opposite surfaces of the lower peripheral portion 28 of the sign panel in a substantially flat relationship therewith. Preferably, the clamping faces 44 and 46 engage the entire longitudinal width of the lower peripheral portion 28 in order to uniformly distribute the clamping forces thereon and thus minimize stress concentrations. The clamping members 24 and 26 are preferably forcibly urged toward one another to clampingly engage and anchor the sign panel therebetween by means of a plurality of threaded fasteners 50 spaced longitudinally along the base assembly 12. The fasteners 50 preferably extend through corresponding apertures in the clamping members 24 and 26 and in the lower peripheral portion 28 of the sign panel. As an alternative embodiment, the clamping faces 44 and 46 may be sufficiently large to allow for adequate clamping of the sign panel therebetween without having the fasteners 50 extend through the sign panel. In such an embodiment, the fasteners would not have to be removed, but rather would only need to be loosened in order to remove or insert the sign panel between the clamping members. As still another embodiment, if a permanent installation is desired, rivets or other permanent fasteners extending through the clamping members and sign panel may be employed.

It should be noted that as an alternate embodiment to that described above, only one of the clamping members 24 and 26 is required to be secured to the bracket members 30 and 32. In such an embodiment the other clamping member would not be secured to the bracket members and would serve as a backing plate to uniformly distribute the clamping forces along the lower portion 28 of the sign panel 20. Furthermore, whether or not the clamping member 26 is secured to the bracket members 30 and 32, it too may optionally be a hollow member with a generally rectangular cross-section.

The sign panel 20 is preferably composed of a thin sheet material sufficiently rigid that the sign panel is self-supporting in its generally vertical upwardly protruding relationship with the base assembly 12. In order to properly function as a wind-resistant sign, however, the sign panel must be sufficiently flexible and resilient to bendably deflect in a generally lateral direction, without surpassing its yield point, under the influence of predetermined loads, such as high wind forces up to 70 m.p.h., exerted transversely thereon. A preferred lightweight sheet material for the sign panel 20 is an acrylic resin, or other plastic material, either of which may also be reinforced with fiberglass. An example of one exemplary material for the sign panel 20 is "Lumasite" manufactured by Amercian Acrylic Corp. of West Babylon, N.Y. Lumasite is an acrylic sheet of material, cast from methyl methacrylate (acrylic) monomer, reinforced with fiberglass. One skilled in the art will readily recognize that other flexible and resilient materials with similar characteristics and properties may be substituted for the sign panel.

In addition to being strong but light in weight, the acrylic material also offers the advantage of being somewhat absorbent so that the ink used to print a message on the display surfaces of the sign panel is not easily scratched or worn off. Such material is only an exemplary, preferred material, however, and one skilled in the art will readily recognize that other synthetic or nonsynthetic materials may alternatively be employed. As still another example of an alternate material, a sheet metal sign panel composed of high-strength, tempered spring steel may be used. Such spring steel typically has a yield strength of approximately 50,000 p.s.i. Although a flat generally rectangular sign panel 20 is shown in the drawings, for purposes of illustration, the sign panel may also be embossed or non-uniform in thickness, and may have any of an infinite number of lateral profile shapes, so long as the above-discussed rigidity and flexibility are present.

The sign and stand apparatus 10 has a relatively low resultant or combined center of gravity 58, largely because of the lightweight upwardly-protruding sign panel and the low location of the base assembly and legs. The relationship of the combined center of gravity 58 and the length of the generally laterally-extending legs is selected in order to prevent the sign and stand apparatus from tipping over in high winds. In order to achieve this result, the combined or resultant center of gravity 58 is preferably located at a position on the sign panel 20 that is a predetermined vertical distance from the ground 18 such that even when the sign panel deflects, the resultant center of gravity 58 remains between or within boundaries 60 defined by the location of the ground-engaging free ends of the legs 14 and 16 and illustrated in phantom lines in FIG. 1. It should be noted that the resultant center of gravity 58 may shift or change somewhat as the sign panel deflects because during the course of such deflection, more of the mass of the sign panel 20 is located closer to the ground. However, by maintaining the resultant center of gravity 58 within the confines of the base of support provided by the engagement of the legs 14 and 16 with the ground, the tendency of the sign and stand assembly to tip over under the influence of wind forces or other loads exerted transversely on the sign panel 10 is reduced or eliminated.

When the sign panel deflects under strong wind forces, additional resultant forces are generated in a vertically downward direction on the feet or the ends of the legs of the base assembly. This helps to effectively anchor the sign stands in high wind forces.

Furthermore, as mentioned above, the base assembly 12 and the lower edge of the sign panel 20 should be maintained at a slightly elevated position in order to maintain only the free ends of the legs 14 and 16 in engagement with the ground, even when the sign and stand assembly is placed on uneven ground or other supporting surface. This subsstantially ensures that the base of support, as defined by the boundary lines 60, is as broad as possible in order to maximize the resistance of the sign and stand apparatus to tipping in high winds. Subject to the above considerations, however, the lower edge of the base assembly 12 and the sign panel 20 should be located generally adjacent and as close as practicable to the ground in order to minimize the amount of wind that can pass beneath the sign and stand apparatus.

Figure 7:
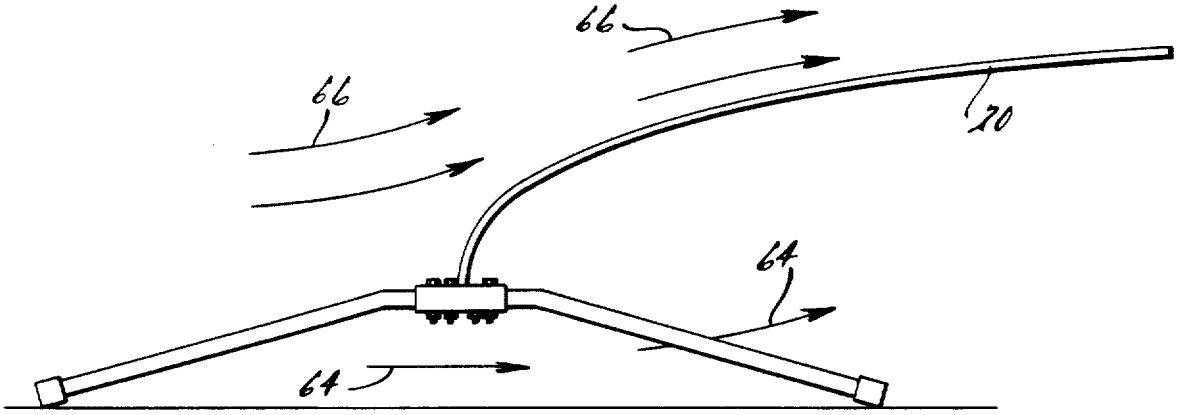
FIG. 7 is a full side view of the sign and stand apparatus with the sign deflected.

The amount of wind allowed to pass beneath the sign must be minimized in order to prevent the sign when deflected from becoming an airfoil. As shown in FIG. 7, the sign takes an arcuate *airfoil* shape when it is deflected in high winds. Thus, the air 66 passing over the top surface of the sign accelerates in velocity creating a low pressure area. This is commonly known as lift and, if large amounts of air 64 are allowed to also pass beneath the sign, the deflected sign 20 would act the same as an airfoil. If such [lift] *high aerodynamic forces* were created on the sign 20, it would allow the sign stand to [become "lighter" and] be actually displaced or turned over by the wind. Therefore, by reducing the open area beneath the sign panel, the amount of wind passing therethrough is reduced. This reduces the size and intensity of the wind forces acting on the underneath side of the sign panel and thus prevents the formation of the undesirable ["lift"] *aerodynamic* forces.

For optimum results, it is preferred that the open area beneath the sign panel be 10% or less in size relative to the size of the sign panel. This has been found to be best for operation of the sign stand in high winds.

Figure 8:
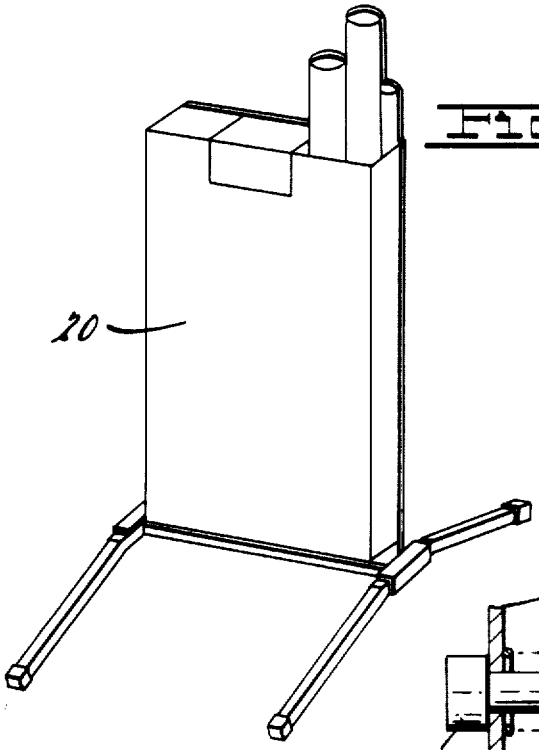
FIGS. 8 and 9 show two alternate embodiments of the sign for use with the present invention.
Figure 10A:
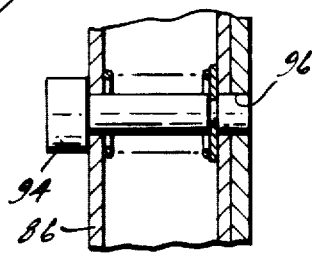
FIG. 10 illustrates still another embodiment of the invention.
Figure 9:
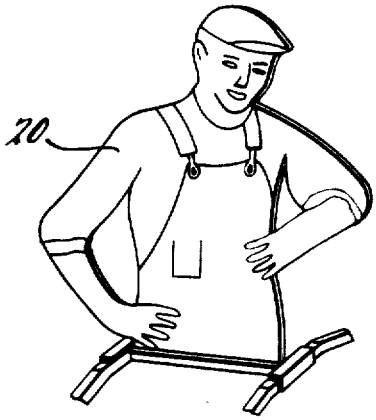
Figure 10:
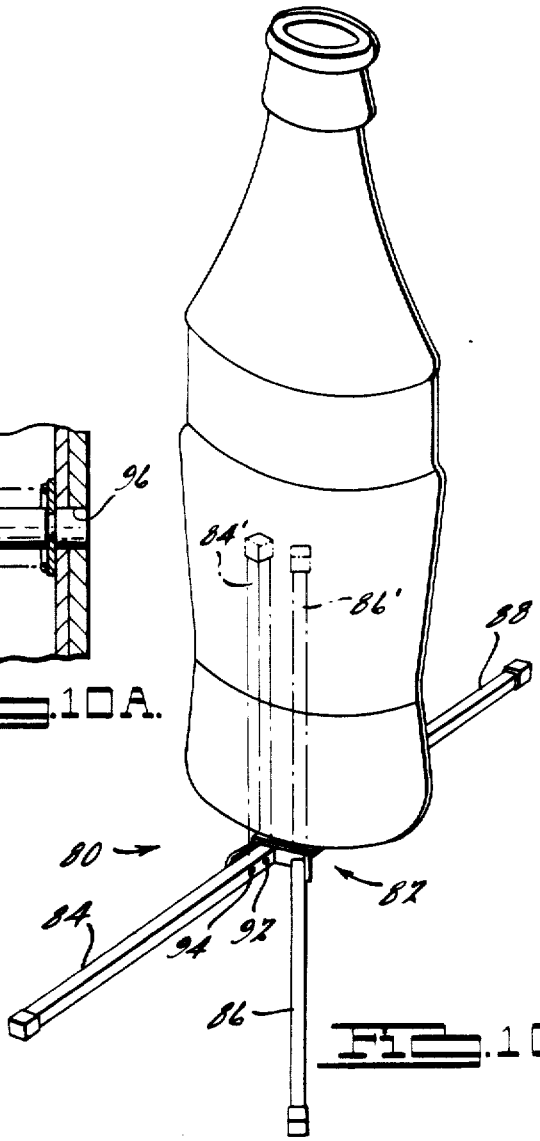

FIGS. 8 through 10 illustrate a significant feature of the invention, namely that the sign 20 can have a wide variety of sizes and shapes. The sign can be made in the shape of the product that it is advertising and promoting. FIG. 8 illustrates the sign 20 formed in the shape of a pack of cigarettes; the perspective view is painted or printed on the sign and adds to the realism of the product. In addition, the same advertisement can be printed or contained on both sides, with one being the mirror image of the other.

FIG. 10 illustrates a sign 20 formed in the shape of a bottle of a popular soft drink. The sign has a large area in order to make a significant impression on consumers, yet the large area is sufficient to cause the sign stand to be affected by highwind forces.

FIG. 9 shows a sign which is formed in the shape of a person who has been presented in advertising as the spokesperson or symbol for a company. As can be seen, the sign 20 can take virtually any shape which creates an opportunity for significant flexibility and creativity in the marketplace.

FIG. 10 also illustrates a sign stand 80 which has a base assembly 82 having foldable legs 84, 86, 88 and a fourth-foldable leg that is behind the sign panel and thus hidden from view. The legs are pivoted around pivot pins 92 and locked in place by spring pins 94 which are adapted to mate with holes 96. When the signs are used for display, the legs are folded downwardly and extend in the manner shown in FIG. 10. When the signs are being transported or stored, the legs are folded into their vertical upright positions, as shown for example by the phantom lines 84' and 86'.

The present invention also has applicability to many outdoor sign and warning devices, such as traffic flow barricades used in the construction field and point-of-purchasing advertising sign stands. In any of these applications, the devices are unanchored, lightweight and portable, and yet can withstand virtually all types of wind forces.

In addition to the various alternate embodiments of the invention described above, the sign panel 20 may also optionally include a hand hole 80, as shown in FIG. 1, for ease and convenience of carry. When the sign panel 20 is removed from the base assembly 12, the inventive sign stand system presents a flat, easily storable and transportable package. Additional hand holes on the side edges of the sign (not shown) could also be provided to facilitate disassembly and transport of the sign stand.

The foregoing discussion discloses and describes exemplary embodiments of the present invention. One skilled in the art will readily recognize from such discussion that various changes, modifications and variations my be made therein without departing from the spirit and scope of the invention as defined in the following claims.

What is claimed is:

1. A lightweight and readily portable sign and stand apparatus, comprising an elongated base assembly, a plurality of ground-engaging legs extending transversely from and secured to said elongated base assembly, a one-piece monolithic sign panel having a lower peripheral portion and protruding in a generally vertical direction from said elongated base assembly and having at least one generally planar display surface thereon, said base assembly including clamping means for clampingly securing and anchoring substantially the entire length of the lower peripheral portion of said sign panel to said elongated base assembly in a generally fixed relationship therewith, said sign panel being sufficiently rigid to be self-supporting in said generally vertically protruding relationship with said base assembly but sufficiently flexible and resilient to bendably deflect without yielding in response to predetermined loads exerted thereon in directions transverse to the plane of said display surface, said sign and stand apparatus having a combined center of gravity located a predetermined vertical distance above the ground, said legs being configured to engage the ground at a predetermined horizontal distance from said base assembly, said combined center of gravity remaining horizontally within the confines of the area defined by the locations at which said legs engage the ground during said bendable deflection of said sign panel in order to substantially prevent said sign and stand apparatus from tipping over in response to said predetermined transverse loads, said sign panel, when deflected, having a continuously curved portion defining an airfoil *shape*, said sign panel having the lower peripheral portion disposed a preselected height above the ground to define an open area generally beneath said sign panel, the size of said open area in relation to the size of said sign panel and [the shape of] said airfoil *shape* cooperating to substantially negate aerodynamic [lift] *forces*.

2. A sign and stand apparatus according to claim 1, wherein said clamping means includes a pair of elongated clamping members adapted to clampingly engage said lower peripheral portion of said sign panel therebetween.

3. A sign and stand apparatus according to claim 2 wherein said elongated clamping members are adapted to clampingly engage said lower peripheral portion of said sign panel along substantially the entire longitudinal length thereof.

4. A sign and stand apparatus according to claim 3, wherein at least one of said elongated clamping members is adapted to resist torsional loads thereon in response to loads exerted on said sign panel in said directions transverse to the plane of said display surface.

5. A sign and stand apparatus according to claim 1, wherein said legs are elongated members having free outer end portions engaging the ground and opposite end portions secured to said base assembly, said free outer ends being the only portions of said sign and stand apparatus engaging the ground.

6. A sign and stand apparatus according to claim 1, wherein said sign panel has a lower edge generally parallel to the ground, said clamping means being adapted to clampingly engage said sign panel generally along said lower edge, said lower edge further being supported by said base assembly in an elevated position generally adjacent to but spaced slightly from the ground.

7. A sign and stand apparatus according to claim 1, wherein clamping means includes a pair of clamping members, each of said clamping members includes a clamping face thereon adapted for a generally flat clamping engagement with one of the opposite surfaces of said sign panel, a number of longitudinally-spaced fasteners extending in a generally lateral direction through said clamping members and said lower peripheral portion of said sign panel, said fasteners being adapted to forcibly maintain said clamping members in said flat clamping engagement with said opposite surfaces of said sign panel, one of said clamping members being secured to the remainder of said base assembly, and the other of said clamping members being detached from said remainder of said base assembly, said one secured clamping member tending to resist torsional loads exerted thereon in response to loads exerted on said sign panel in said directions transverse to the plane of said display surface.

8. A sign and stand apparatus according to claim 1 wherein said open area is ten percent (10%) of or smaller than the surface area of said sign panel.

9. A lightweight and readily portable sign and stand apparatus, comprising an elongated base assembly extending in a longitudinal direction, at least two pairs of elongated ground-engaging legs secured to said base assembly with each pair of legs laterally protruding a predetermined distance in generally opposite lateral directions from said base assembly and engaging the ground at their free outer ends, a generally planar one-piece monolithic sign panel protruding in a generally vertical direction with a lower peripheral portion thereof secured to said base assembly in a generally fixed relationship therewith, said base assembly including a pair of longitudinally-extending clamping members clampingly engaging opposite surfaces of said sign panel therebetween along substantially all of the longitudinal length of said lower peripheral portion in order to anchor and generally fix said sign panel to said base assembly, said sign panel being sufficiently rigid to be self-supporting in order to maintain itself in said generally vertical protruding relationship with said base assembly but sufficiently flexible and resilient to deflect without yielding in a generally lateral direction relative to said elongated base assembly in response to predetermined loads exerted transversely on said sign panel, said sign and stand apparatus having a predetermined combined center of gravity that remains laterally within the confines of a lateral area defined by the locations at which said legs engage the ground regardless of said deflection of said sign panel in response to said predetermined transverse loads exerted on said sign panel, said sign and stand apparatus thereby being substantially prevented from tipping over as said sign panel deflects under the influence of wind forces exerted on said sign panel, said sign panel, when deflected, having a continuously curved portion defining an airfoil *shape*, said sign panel having said lower peripheral portion disposed a preselected height above the ground to define an open area generally beneath said sign panel, the size of said open area in relation to the size of said sign panel and [the shape of] said airfoil *shape* cooperating to substantially negate aerodynamic [lift] *forces*.

10. A sign and stand apparatus, according to claim 9, wherein said sign panel is sufficiently resilient to return to its generally vertically protruding position after said deflection when said transverse loads are removed therefrom.

11. A sign and stand apparatus according to claim 9, wherein said clamping members include generally vertically extending faces thereon, said faces engaging said opposite faces of said sign panel in a substantially flat relationship therewith when said sign panel is clampingly anchored therebetween.

12. A sign and stand apparatus according to claim 9, wherein said pairs of legs are longitudinally spaced from one another.

13. A sign and stand apparatus according to claim 12, wherein one of said pairs of legs is located generally at each end of said elongated base assembly.

14. A sign and stand apparatus according to claim 9, wherein said sign panel is composed of a reinforced acrylic resin material.

15. A sign and stand apparatus according to claim 9, wherein said sign panel is composed of high-strength tempered spring steel.

16. A sign and stand apparatus according to claim 9, wherein at least one of said longitudinally-extending clamping members comprises a generally hollow member having a generally rectangular lateral cross-section.

17. A sign and stand apparatus according to claim 16, where the other of said longitudinally-extending clamping members has a generally L-shaped lateral cross-section.

18. A sign and stand apparatus according to claim 17, wherein each of said clamping members includes a clamping face thereon adapted for a generally flat clamping engagement with one of said opposite surfaces of said sign panel, a number of longitudinally-spaced fasteners extending in a generally lateral direction through said clamping members and said lower peripheral portion of said sign panel, said fasteners being adapted to forcibly maintain said clamping members in said flat clamping engagement with said opposite surfaces of said sign panel.

19. A sign and stand apparatus according to claim 9, wherein one of said clamping members is secured to the remainder of said base assembly, and the other of said clamping members being detached from said remainder of said base assembly.

20. A sign and stand apparatus according to claim 19, wherein each of said clamping members includes a clamping face thereon adapted for a generally flat clamping engagement with one of the opposite surfaces of said sign panel, a number of longitudinally-spaced fasteners extending in a generally lateral direction through said clamping members and said lower peripheral portion of said sign panel, said fasteners being adapted to forcibly maintain said clamping members in said flat clamping engagement with said opposite surfaces of said sign panel, said one secured clamping member tending to resist torsional loads exerted thereon in response to loads exerted transversely on said sign panel.

21. A sign and stand apparatus, comprising:

a base assembly including a pair of generally longitudinally-extending clamping members having opposed laterally-facing and generally vertically-extending clamping faces thereon, means for selectively and forcibly urging said clamping faces toward one another, a pair of legs extending in opposite generally lateral directions and being secured to at least one of said clamping members at each opposite end thereof, each of said legs being adapted for engaging the ground at a free outer end thereof;

a one-piece monolithic sign panel composed of a sheet material, said sign panel having substantially the entire length of a lower end portion adapted to be received between said clamping faces and to be clampingly engaged thereby in a generally flat mutual engagement therewith in order to secure said sign panel to said base assembly in a generally fixed relationship therewith, said lower end portion being at an elevated position relatively closely adjacent to but spaced from the ground when secured to said base assembly, said sheet material being sufficiently resilient and flexible to resiliently deform in a generally lateral direction without yielding in response to predetermined forces exerted transversely thereon, said sheet material further being sufficiently rigid to be self-supporting in a generally vertically protruding relationship with said clamping members; and said sign and stand apparatus having a combined resultant center of gravity located at a predetermined vertical position such that as said sign panel deflects said center of gravity remains laterally between the lateral confines of said ground-engaging ends of said legs, thereby substantially preventing said sign and stand apparatus from tipping over in response to wind loads exerted thereon, said sign panel, when deflected, having a continuously curved portion defining an airfoil *shape*, said sign panel having a lower peripheral portion disposed a preselected height above the ground to define an open area generally beneath said sign panel, the size of said open area in relation to the size of said sign panel and [the shape of] said airfoil *shape* cooperating to substantially negate aerodynamic [lift] *forces*.

22. A sign and stand apparatus according to claim 21, wherein said means for forcibly urging said clamping faces toward one another comprises a plurality of longitudinally-spaced threaded fasteners extending laterally through corresponding longitudinally-spaced apertures in said clamping members and in said lower end portion of said sign panel.

23. A sign and stand apparatus according to claim 22, wherein said sheet material is composed of fiberglass-reinforced acrylic resin.

24. A sign and stand apparatus according to claim 22, wherein said sheet material is composed of high-strength tempered spring steel.

25. A sign and stand apparatus according to claim 21, wherein said clamping member that is secured to said legs tends to resist torsional loads exerted thereon in response to loads exerted transversely on said sign panel.

26. A sign and stand apparatus according to claim 25, wherein each of said clamping members includes a clamping face thereon adapted for a generally flat clamping engagement with one of said opposite surfaces of said sign panel, a number of longitudinally-spaced fasteners extending in a generally lateral direction through said clamping members and said lower peripheral portion of said sign panel, said fasteners being adapted to forcibly maintain said clamping members in said flat clamping engagement with said opposite surfaces of said sign panel.

27. A lightweight and readily portable sign and stand apparatus, comprising an elongated base assembly, a plurality of ground-engaging legs extending transversely from and secured to said elongated base assembly, a one-piece monolithic sign panel having a lower peripheral portion protruding in a generally vertical direction from said elongated base assembly and having at least one generally planar display surface thereon, said base assembly including clamping means for clampingly securing and anchoring substantially the entire length of the lower peripheral portion of said sign panel to said elongated base assembly in a generally fixed relationship therewith, said sign panel being sufficiently rigid to be self-supporting in said generally vertically protruding relationship with said base assembly but sufficiently flexible and resilient to bendably deflect without yielding in response to predetermined loads exerted thereon in directions transverse to the plane of said display surface, said sign and stand apparatus having a combined center of gravity located a predetermined vertical distance above the ground, said legs being configured to engage the ground at a predetermined horizontal distance from said base assembly, said combined center of gravity remaining horizontally within the confines of the area defined by the locations at which said legs engage the ground during said bendable deflection of said sign panel in order to substantially prevent said sign and stand apparatus from tipping over in response to said predetermined transverse loads, said sign panel, when deflected, having a continuously curved portion defining an airfoil *shape*, said sign panel having a lower periphery defining means for substantially limiting air flow beneath said sign panel and thereby substantially negating the aerodynamic [lift] *forces* of said *airfoil shape* .

* * * * *

UNITED STATES PATENT AND TRADEMARK OFFICE

CERTIFICATE OF CORRECTION

PATENT NO. : RE. 32,359

DATED : February 24, 1987

INVENTOR(S) : James R. Seely

It is certified that error appears in the above-identified patent and that said Letters Patent is hereby corrected as shown below:

| | | |
|---|---|---|
| Column 1, | line 23, | after "them" insert -- to --. |
| Column 5, | line 23, | "subsstantially" should read -- substantially --. |
| Column 5, | line 35, | delete "becoming an airfoil" and insert -- creating high aerodynamic forces --. |
| Column 5, | line 39, | delete "is commonly known as lift" and insert -- will create aerodynamic forces --. |
| Column 5, | line 41, | delete "would act the same as an airfoil" and insert -- will have high aerodynamic forces --. |
| Claim 6, | line 29 | change "hand hole 80" to -- hand hole 70 --. |

This certificate supersedes Certificate of Correction issued July 28, 1987.

Signed and Sealed this

Twenty-second Day of December, 1987

*Attest:*

DONALD J. QUIGG

*Attesting Officer*

*Commissioner of Patents and Trademarks*